March 31, 1953  A. E. ZABRISKIE ET AL  2,633,157
TEMPLE THREAD CUTTER

Filed Nov. 1, 1949  2 SHEETS—SHEET 1

INVENTORS.
ARTHUR E. ZABRISKIE
MURRAY H. STUART
BY
Virgil F. Davico
ATTORNEY

March 31, 1953 A. E. ZABRISKIE ET AL 2,633,157
TEMPLE THREAD CUTTER
Filed Nov. 1, 1949 2 SHEETS—SHEET 2
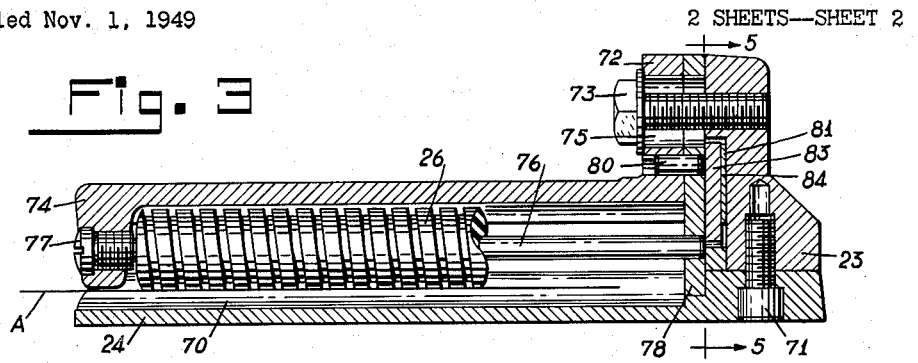
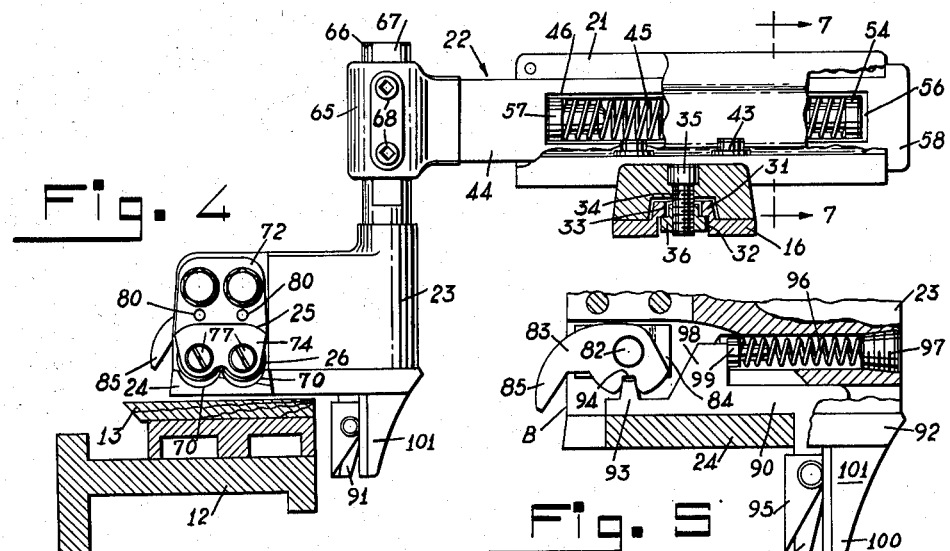
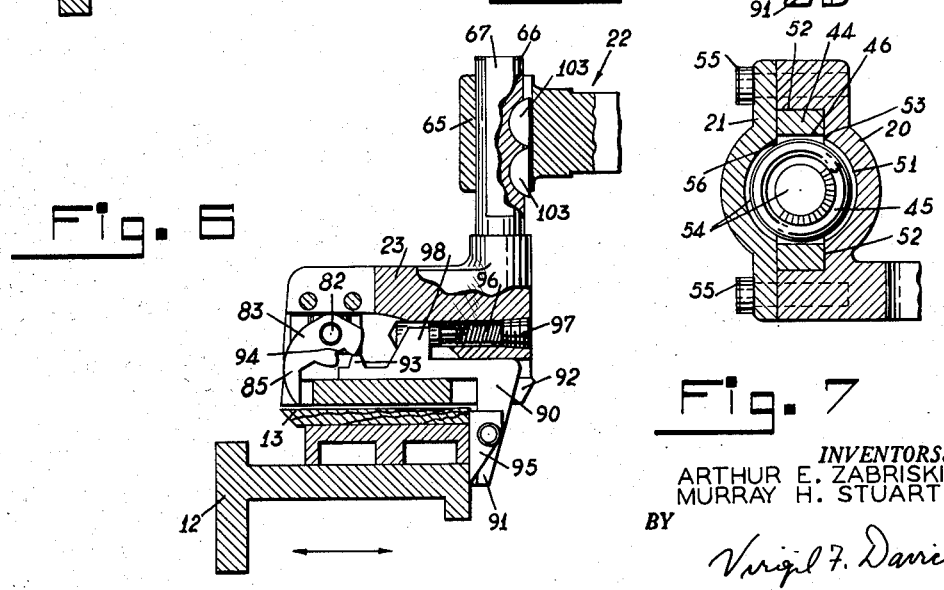
*INVENTORS.*
ARTHUR E. ZABRISKIE
MURRAY H. STUART
BY
*ATTORNEY*

Patented Mar. 31, 1953

2,633,157

UNITED STATES PATENT OFFICE 2,633,157

TEMPLE THREAD CUTTER

Arthur E. Zabriskie, Jersey City, N. J., and Murray H. Stuart, New York, N. Y., assignors, by mesne assignments, to Steel and Alloy Tank Company, Newark, N. J., a corporation of New Jersey Application November 1, 1949, Serial No. 124,912

7 Claims. (Cl. 139—266)

The present invention relates to loom temples and to thread cutters associated therewith.

Temples are usually provided on looms on the opposite sides of the cloth woven and near the fell thereof to hold the cloth out as wide as possible during the process of weaving to reduce hour-glass effect.

When the bobbin hopper is filled, the end of the filling yarn from each bobbin is secured by being wound around a stud or post on the outside of the hopper. Consequently, whenever fresh filling is transferred to the shuttle, a length of filling yarn extends from the hopper stud or post to the selvage on the right-hand side of the cloth.

The outgoing filling end is usually severed near the shuttle and clamped near the severed end, thereby leaving a filling end from the ejected bobbin extending from the right-hand selvage.

The temple on the right-hand or battery side of the loom is usually provided with a device known as a temple thread cutter for severing the ends of the fillings extending beyond the right-hand selvage, as described.

In the conventional type of temple device, the temple roll is mounted on an inclined temple bar adjustable lengthwise in the temple stand, so that horizontal and vertical adjustments of the temple roll are effected simultaneously and dependently. Moreover, the temple roll is usually mounted on the temple trough over which the cloth edge rides in engagement with the temple roll, so that removal of the temple top leaves the temple roll on the trough in a somewhat inaccessible position for cleaning.

The conventional temple thread cutter comprises a blade movable into thread cutting position by means of a projection rigid with said blade and adapted to be struck by the lay beam when moving toward front center position. With the blade and projection rigidly secured together as a movable unit, the extent of the thread cutting movement of the blade will depend on the extent of movement of the lay beam towards front center position. This rigid tie-up between the lay movement and blade movement often causes breakage of temple parts.

One object of the present invention is to provide a new and improved temple device, which permits vertical and horizontal adjustments in the position of the temple roll independently of each other, and which permits easy access to the temple roll for cleaning or other purposes.

A further object is to provide a new and improved resilient mounting for the temple bar or rod, which permits the temple to be reciprocated by the lay movement to avoid contact of the reciprocating reed therewith in front center position of the lay and which is designed to hold said temple bar effectively against tilting movement about its longitudinal axis while being reciprocated.

Another object of the invention is to provide a new and improved temple thread cutter having a movable blade constructed and actuated by the lay movement in a manner to obviate the possibility of breakage of any of the temple parts as a result of extreme lay movements.

Various other objects of the invention will be apparent from the following particular description and from an inspection of the accompanying drawings, in which—

Fig. 3 is a section of the temple taken on lines 3—3 of Fig. 2, but shown on a larger scale;

Fig. 4 is a section of the temple taken on lines 4—4 of Fig. 2, but on a larger scale;

Fig. 5 is a section of the temple taken on lines 5—5 of Fig. 2, but on a larger scale and taken also on lines 5—5 of Fig. 3;

Fig. 6 is a section of the temple similar to that of Fig. 5, but taken after completion of thread cutting operations and in front center position of the lay beam; and Fig. 7 is a section of the temple taken on lines 7—7 of Fig. 4.

Figure 1:
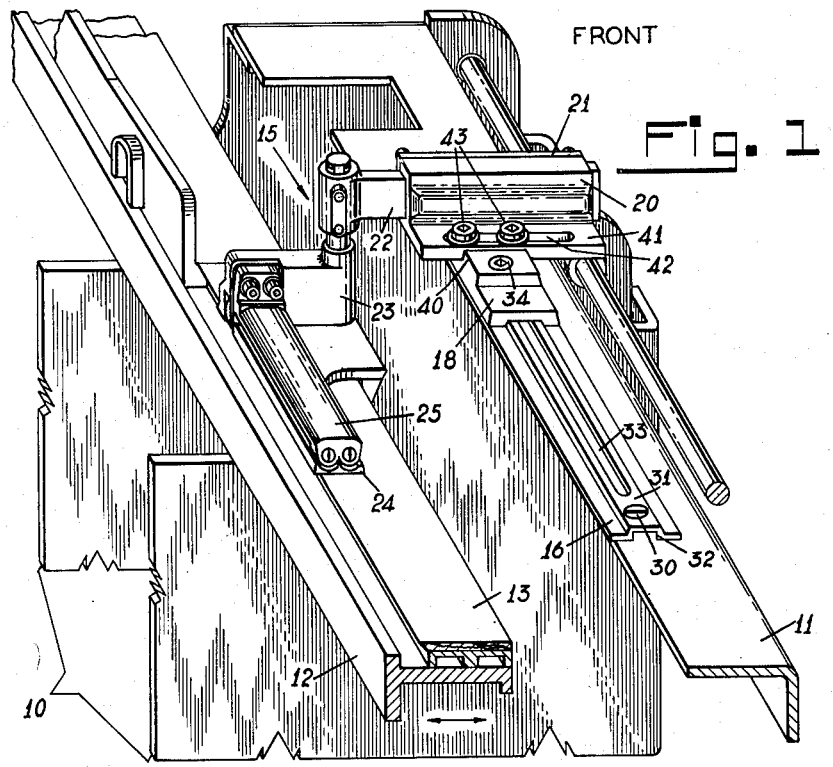
Fig. 1 is a perspective of the right-hand side of a loom, showing a temple and associated thread cutter embodying the present invention and shown just prior to thread cutting operations.
Figure 2:
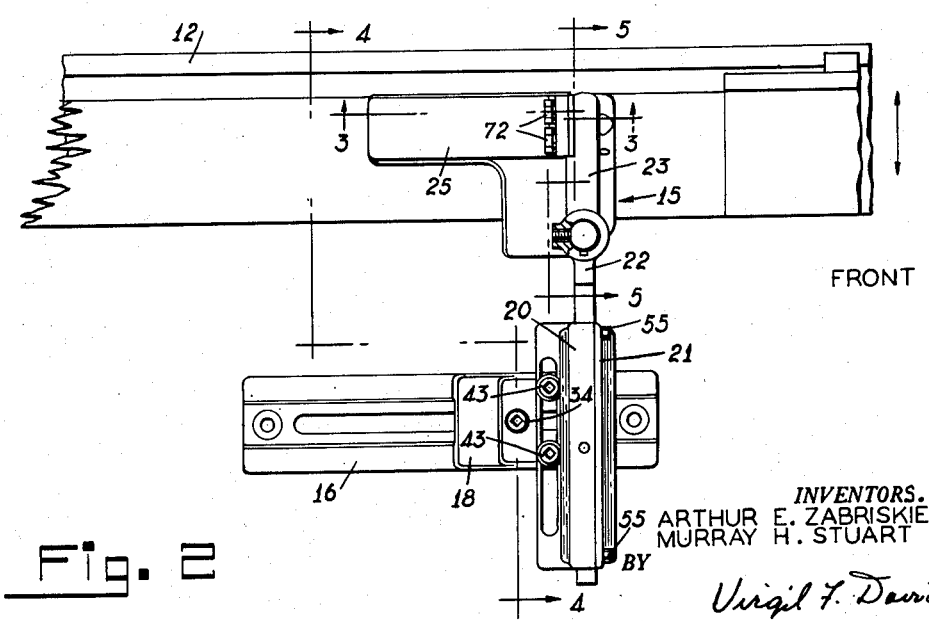
Fig. 2 is a top plan view of the right-hand side of the loom, showing the temple and associated thread cutter just prior to thread cutting operations.

Referring to the drawings, and especially to Figs. 1 and 2, the loom comprises generally loomsides 10 (only the right-hand loomside being shown) supporting along the front a breast beam 11 under which the cloth passes, a lay beam 12 supported by the usual lay swords (not shown) for oscillating movement back and forth along the loom and provided with a race plate 13 and temples 15 (only the right-hand temple being shown) for distending the woven cloth sideways. The two temples 15 on opposite sides of the loom are similar, except that the right-hand temple shown is provided with a thread cutter to be described.

Each temple 15 comprises a base plate 16 fastened to the breast beam 11, a slide 18 adjustably fastened to said base plate, a stand 20 and cap 21 for said stand adjustably secured to said slide, a substantially horizontal temple bar or rod 22 resiliently retained in the enclosure defined between said stand and said cap for reciprocation therein, a bracket 23 adjustably carried at the rear end of said temple bar, a temple trough 24 secured to said bracket, a temple top 25 also secured to said bracket, and temple rolls 26 enclosed in the housing defined by said temple trough and said temple top.

The temple base plate 16 is fastened to the breast beam 11 by a screw 30 at each end of the base plate and is channeled to define a guideway 31 along its upper side and a groove 32 along its lower side. A slot 33 extending along the guideway 31 and the groove 32 receive bolts 34 for adjustably fastening the slide 18 to the base plate 16.

The temple slide 18 is channeled to correspond in shape to that of the base plate 16 and straddles said base plate for adjusting guided movement therealong. Each of the bolts 34 passes through the temple slide 18 and through the slot 33 in the base plate 16 and is desirably provided with a head 35 socketed to received suitable wrench, and with a stepped nut 36 extending into the groove 32 and into said slot and held by its polygonal configuration in said groove against turning.

The stand 20 is seated in a recess 40 in the slide 18 and has a base flange 41 with an elongated slot 42 for receiving mounting studs 43 threaded into the sides of said slide. This arrangement permits horizontal adjustment of the stand towards the front or rear of the loom.

The temple bar 22 has a shank 44 of oblong rectangular cross-section extending into the stand and cap unit 20, 21 with slide fit and resiliently pressed rearwardly of the loom by a coil spring 45 retained in a slot 46 in said bar shank and housed in said stand and cap unit. To slidably receive the temple bar shank 44, the stand 20 defines a channel having a center arcuate part 51 to receive the coil spring 45 and a right angular recess 52 at the top and bottom to receive the temple bar shank 44. The front end of the stand 20 is provided with a wall 53 defining a shoulder against which the front end of the coil spring 45 bears through an intervening spring guide pin 54.

The cap 21 is secured to the stand 20 by means of studs 55 and defines with said stand the housing to receive the coil spring 45 and to reciprocably receive the temple bar shank 44. This cap is also provided with a front end wall 56 defining a shoulder and cooperating with the end front wall 53 of the stand 20 to form an abutment for the spring guide pin 54. The two end walls 53 and 56 are spaced to define a rectangular opening at the front end of the stand and cap unit 20, 21 through which the temple bar shank 44 passes with a snug slide fit. At the other rear end of the stand and cup unit 20, 21, there is a similar opening for the temple bar shank 44.

The coil spring 45 bears at its front end against the fixed end walls 53 and 56 of the stand and cap unit 20, 21 through the guide pin 54, as described. At the rear end, the coil spring 45 bears against the rear end of the bar slot 46 through a spring guide pin 57, so that the temple bar 22 is urged by said coil spring towards the lay beam 12 and rearwardly of the loom. To limit rearward movement of the temple bar 22, the front end of the temple bar shank 44 is provided with a head 58. The head 58 abuts the front end of the stand and cap unit 20, 21 in inactive position of the temple thread cutter, shown in Fig. 4.

For adjustably connecting the bracket 23 to the rear end of the temple bar 22, said bar end has a collar 65 embracing a substantially vertical post 66 integral with or otherwise rigidly connected to said bracket. The post 66 is cylindrical except for a flattened or chordal section 67. Set screws 68 in the collar 65 bearing against the flattened section 67 of the post 66 holds the post in vertically adjusted position with respect to said collar. The bore of the collar 65 is cylindrical, keys 103 are employed to prevent rotation of the post 66 relative to the collar 65.

The temples of the present invention are shown of the double-roll type, such as are used on fabrics with heavy contraction or such as are required for better control of the woven cloth, although as far as certain aspects of the invention are concerned, the temples may be of the single-roll type for use on light fabrics with a moderate amount of contraction. For a double-roll construction, the temple trough 24 in the form of a plate has adjoining channels 70 disposed alongside of each to receive the edge of the cloth thereover and to receive also the lower sections of the two temple rolls 26 respectively. The temple trough plate 24 is secured to the lower section of the bracket 23, as for example, by the studs 71.

The temple top 25 is adapted to be disposed over the temple trough plate 24 to form therewith a housing for the temple rolls 26, and comprises a mounting flange 72 at one end removably secured to the bracket 23 by means of the studs 73 and a flange 74 at the other end for mounting the temple rolls 26. The holes 75 in the temple top mounting flange 72 through which the studs 73 pass are desirably elongated in a vertical direction to permit vertical adjustment of the temple top 25 with respect to the temple trough 24.

For supporting the temple rolls 26 in position, a spindle 76 passes through each of the rolls and holds it in position and at the same time allows it to revolve freely. This spindle has a screw head 77 at its outer end threaded into the end flange 74 of the temple top 25 and has its other inner end supported with a slide fit in a plate 78 affixed to the bracket 23 and forming a stationary part of the thread cutter, as will be described. For the temple on the left-hand side of the loom, since this temple would not have a thread cutter, the inner end of the temple roll spindle 76 would be supported directly in the bracket 23.

The temple rolls 26 are shown of the spirally grooved type made of hard rubber or similar material and especially useful for rayon fabrics. For cotton fabrics or the like, the rolls may be made of wood with small pins set in such a manner as to distend the cloth sideways. The cloth A in either case will pass between the trough plate 24 and the temple rolls 26 and will be held thereby against contraction.

The temple on the right-hand side of the loom shown is provided with a thread cutter operatable from the lay motion. The cutter comprises the stationary knife 78 in the form of a plate clamped in position between the temple top mounting flange 72 and the bracket 23 by means of dowel pins 80 press-fitted into said flange and said knife. Pivotally supported in a recess 81 of the bracket 23 by means of a pivot pin 82 is a movable knife 83 disposed in face shearing contact with the fixed knife 78 and resiliently pressed there against by a leaf spring 84. The movable knife 83 has a cutting prong section 85 projecting beyond the bracket 23 and adapted to catch the filling end B and to cut it upon movement of the lay beam 12 toward front center position.

For actuating the movable knife 83 from the lay motion, there is provided a slide 90 movable over the trough plate 24 and having near one end a depending tongue or catch extension 91 passing through a slot 92 in said plate. Near the other end, the slide 90 has a releasable latch connection with the knife 83 comprising a rack gear tooth 93 extending into a gear notch 94 in said knife. The catch 91 is disposed in the path of reciprocating movement of the lay beam 12 and is covered with a cushioning pad 95, made for example of leather. As the lay beam 12 moves toward front center position, it engages the catch 91 and moves the slide 90 therewith forward towards the right (Fig. 5), thereby causing the knife 83 to rotate counterclockwise about the axis of its pivot support 82. As the knife 83 rotates counterclockwise as described, the filling end B is engaged by the cutting section 85 of said knife and severed near the selvage.

The forward movement of the slide 90 towards the right (Fig. 5) for thread cutting action is effected against the action of a coil spring 96 housed in the bracket 23 and having one end bearing against a screw plug 97 in said bracket and having the other end bearing against a projection 98 on said slide, indirectly through an intervening spring guide pin 99.

It has been made apparent by the spring mounting of the temple bar 22 in the stand and cap unit 20, 21 that the temple is of the reciprocating type. To prevent the reed (not shown) from coming into contact with the projecting knife 83 and to prevent thereby said reed from being damaged and said knife from bearing the strain of moving the temple at each pick of the loom, the bracket 23 has integral or otherwise rigid therewith a depending heel 100 in the path of movement of the lay beam 12 adapted to be engaged by said lay beam near its front center position and to cause the temple to be pushed thereby against the action of the temple bar spring 45 for a short distance, until said lay beam reaches extreme front center position. A pad 101 of cushioning material such as leather faces the heel 100. Return movement of the temple is effected through the action of the spring 45.

The slide 18 can be adjusted along the base plate 16 to govern the proximity of the temple rolls 26 to the selvage. The stand and cap unit 20, 21 can be adjusted along the slide 18 to determine the horizontal position of the temple rolls 26 along the edge of the cloth and the post 66 can be adjusted vertically in the collar 65 of the temple bar 22 independently of the horizontal adjustment of said temple rolls, to adjust the elevation of said temple rolls. The elevation of the temple rolls 26 with respect to the temple trough 24 can be adjusted through the studs 73 independently of any other adjustments.

Since the temple rolls 26 are supported on the temple top 25 to form a unit therewith, removal of said top from the bracket 23 renders said rolls readily accessible for easy cleaning, repair or replacement.

In the operation of the temple, while the reciprocating lay beam 12 is in position away from the temple, the slide 90 is in the extreme position shown in Fig. 5 under the influence of the spring 96. In this position of the slide 90, its tooth 93 is in mesh with the notch 94 in the movable knife 83, and the cutting section 85 of said knife is in raised inactive position shown.

As the lay beam 12 moves forward towards front center position, it engages the catch 91 on the slide 90 and moves said slide forward towards the right (Fig. 5) against the action of the spring 96. This movement of the slide 90 causes counterclockwise rotation of the knife 83 about the axis of its pivot pin 82 and forces the cutting section 85 of said knife downwards and forwards to cut the end of the filling B extending from the selvage.

As the forward movement of the slide 90 continues under the influence of the lay beam 12, and after the cutting of the end of the filling is completed, the tooth 93 on said slide moves out of mesh with the notch 94 in the knife 83, as shown in Fig. 6, so that rotative movement of said knife about the axis of its pivot pin 82 is discontinued, even though said lay beam continues its movement towards front center position. It is seen, therefore, that the extent of actuation of the knife 83 is independent of the extent of movement of the lay beam 12 towards front center position, thereby obviating the possibility of braking temple parts as the result of excessive movement of said lay beam.

As the lay beam 12 continues its movement towards front center position and before the reed engages the knife 83, said lay beam engages the heel 100 and moves the temple parts on the temple bar 22 a small distance against the action of the spring 45, until said lay beam reaches front center position shown in Fig. 6.

As the lay beam 12 moves in the opposite direction rearward towards rear center position, the temple parts on the temple bar 22 move rearward a small distance under the action of the spring 45, and the slide 90 returns towards the left (Fig. 6) under the action of the spring 96. During this return movement of the slide 90, the tooth 93 on said slide reenters the notch 94 in the knife 83 and rotates thereby said knife clockwise into the initial inactive position shown in Fig. 5 in readiness for the next thread cutting cycle.

While the invention has been described with particular reference to a specific embodiment, it is to be understood that it is not to be limited thereto, but is to be construed broadly and restricted solely by the scope of the appended claims.

What is claimed is:

1. In a loom, the combination comprising a lay beam, and a temple thread cutter including a movable thread cutting knife, a transmission between said lay beam and said knife for moving said knife into thread cutting position as said lay beam moves towards front center position, and means for interrupting said transmission before said lay beam reaches front center position for discontinuing the movement of said knife, while said lay beam continues towards front center position.

2. In a loom having a reciprocable lay beam, a temple thread cutter comprising a movable thread cutting knife, a catch in the path of movement of the lay beam adapted to be actuated thereby, and means for moving said knife towards thread cutting position as said catch is actuated by said lay beam during one stroke of each cycle and comprising a latch connection between said catch and said knife, said latch connection automatically releasing said catch from said knife before said lay beam has completed each of its thread cutting strokes to discontinue movement of said knife.

3. In a loom having a reciprocable lay beam, a temple thread cutter comprising a movable thread cutting knife, a catch in the path of movement of the lay beam adapted to be actuated thereby, and means for moving said knife towards thread cutting position as said catch is actuated by said lay beam and comprising a transmission member between said catch and said knife having a latch engagement with said knife, said transmission member movable by said catch into and out of operative engagement with said knife.

4. In a loom having a reciprocable lay beam, a temple thread cutter comprising a thread cutting knife supported for thread cutting movement, a slide separable from said knife and having a catch projection in the path of movement of the lay beam, and a gear connection between said slide and said knife for moving said knife into and out of thread cutting position, said slide being movable into and out of gear mesh with said knife to cause said slide to move idly during a part of each of its strokes.

5. In a loom, a combination as described in claim 4, said knife being pivotally supported for movement in and out of thread cutting position, and said gear connection including a rack tooth on said slide and a gear tooth on said knife.

6. In a loom, the combination as described in claim 4, comprising spring means acting on said slide to urge it towards gear mesh engagement with said knife.

7. In a loom having a lay beam, a temple thread cutter comprising a thread cutting knife movable through a path of substantially constant length from a normal non-cutting position into cutting position, and means biased to engage said knife for movement into said normal position thereof, said biased means movable in response to the movement of the lay beam towards center position and engaging said knife for movement from said normal position to said cutting position thereof, said biased means releasing said knife in said cutting position and continuing its lay responsive movement to the center position of said lay.

ARTHUR E. ZABRISKIE.
MURRAY H. STUART.

REFERENCES CITED

The following references are of record in the file of this patent:

UNITED STATES PATENTS

| Number | Name | Date |
|---|---|---|
| Re. 8,656 | Porter et al. | Apr. 1, 1879 |
| 539,241 | Stimpson | May 14, 1895 |
| 604,632 | Northrop | May 24, 1898 |
| 668,133 | Stimpson | Feb. 12, 1901 |
| 1,912,476 | Douglas | June 6, 1933 |
| 1,971,255 | Douglas | Aug. 21, 1934 |
| 1,981,723 | Dodge et al. | Nov. 20, 1934 |
| 2,083,496 | Brown | June 8, 1937 |
| 2,366,994 | Arlequeeuw | Jan. 9, 1945 |

FOREIGN PATENTS

| Number | Country | Date |
|---|---|---|
| 246,922 | Italy | Apr. 9, 1926 |